June 30, 1936.　　R. W. CRETNEY　　2,045,635
MANOMETER
Filed Aug. 14, 1931
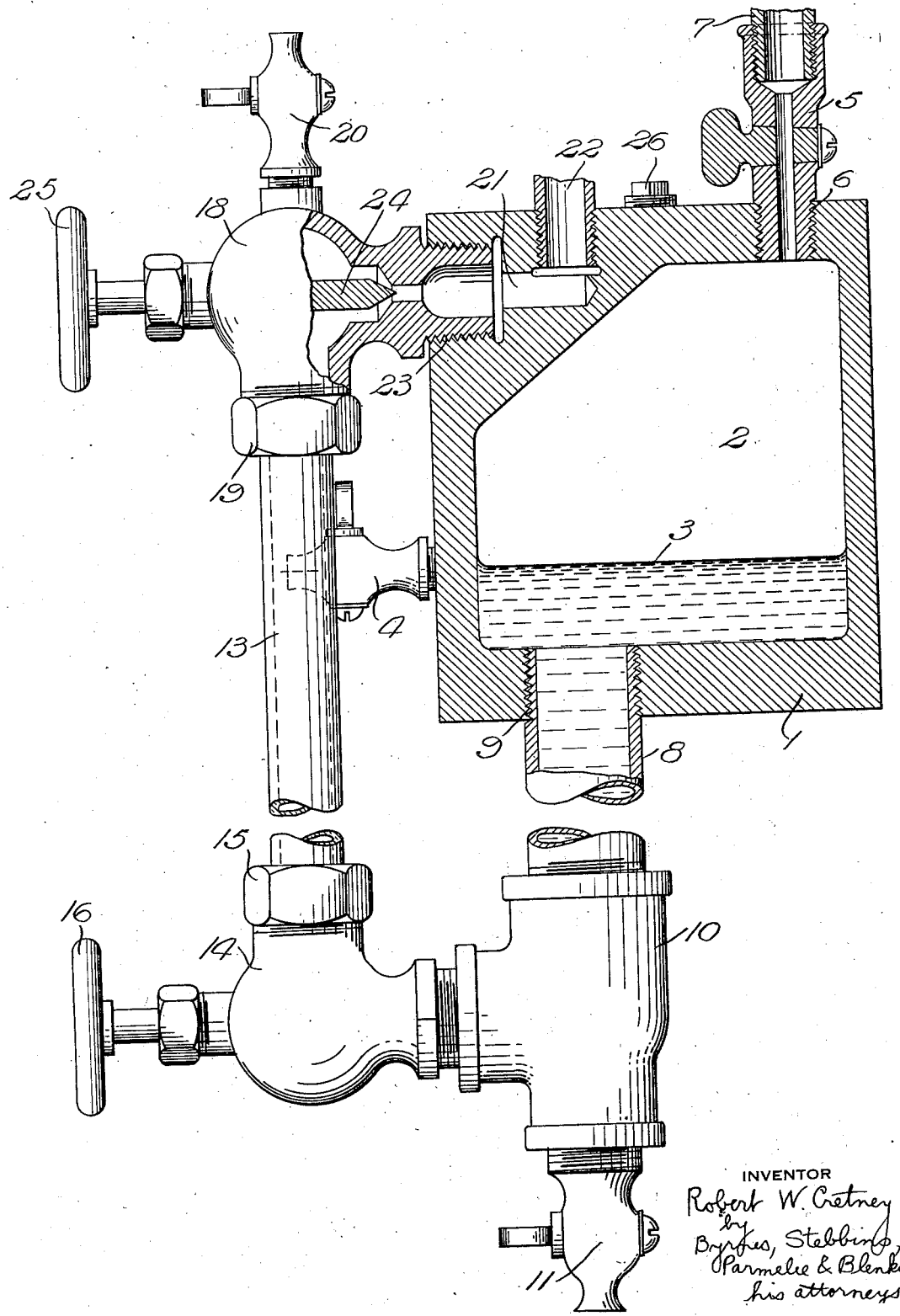
INVENTOR
Robert W. Cretney
by
Byrnes, Stebbins,
Parmelee & Blenko
his attorneys Patented June 30, 1936

2,045,635

UNITED STATES PATENT OFFICE 2,045,635

MANOMETER

Robert Wesley Cretney, Sterlington, La., assignor to Thermatomic Carbon Company, Pittsburgh, Pa., a corporation of Delaware Application August 14, 1931, Serial No. 557,050

4 Claims. (Cl. 73—31)

This invention relates to an improved manometer for measuring the difference between two pressures. The type of manometer in general use for measuring differential pressure across a portion of an apparatus, for instance the differential pressure across orifice plates, is based upon the principle that the differential pressure may be measured by the displacement of liquid in a tube bent in the form of the letter U.

When one leg of the U-tube is attached to a system under pressure, the difference in the level of the liquid in the two columns will measure the static pressure. For measuring the differential pressure across a portion of the apparatus, one leg of the U-tube is connected to the high pressure and one to the low pressure, and the difference in elevation of the two columns represents the differential pressure.

Instead of the simple form of manometer consisting only of a U-tube, a modification may be employed including a large chamber constituting a reservoir into which and from which the liquid may flow with variations in pressure. When the bore of the gauge glass is comparatively small, the liquid level of the reservoir is not materially affected with variations in pressure and, therefore, the pressure may be directly read. Even when the ratio of the tube area to the pot area is so small that the error in reading the manometer is quite small, the measuring scale on the tube is sometimes graduated to compensate for the slight lowering of the liquid level in the pot, thereby giving considerably increased accuracy of reading.

The pot-type of gauge has a distinct advantage over the simple U-gauge in that the latter requires frequent refilling, due to the fact that whenever the pressure rises or falls to an unusual extent, part or all of the measuring liquid is blown out of the gauge. This over-ranging of the gauge requires that the same be shut off so that it may be refilled. The pot-type of gauge is not subject to loss of liquid to the same extent as the simple U-type of gauge. Both types of gauge are, however, subject to loss of measuring liquid if the differentials are sudden, or when the differentials being measured occur across an orifice plate, or with a Pitot tube where the flow is alternately on and off. The sudden variations in pressure cause the disadvantages above pointed out to be very much exaggerated. I have discovered that the interruption of the operation of the pot-type of gauge may be taken care of by connecting the reservoir to the lower of the two pressures. In a manometer arranged in accordance with the principles of my invention, a relatively large reservoir is exposed to the lower of the two pressures in question, and a transparent liquid container has its lower portion connected to the reservoir below the normal liquid level in the same and its upper portion exposed to the higher pressure. As the pressure acting on the liquid in the reservoir drops, or the pressure introduced into the upper portion of the transparent liquid container rises, or when both occur simultaneously, liquid flows into the reservoir. It will be noted, however, that over-ranging of the gauge will not cause the liquid to be lost. Even though, taking the extreme case, the variations in pressure be so great that all of the liquid be forced out of the transparent liquid container, the reservoir holds the liquid; and upon return to normal pressure conditions, the pressure differential is again accurately indicated by the level of liquid in the transparent liquid container. It should be noted in this connection that the loss from the manometer of even a small quantity of liquid may cause the reading of the manometer to be inaccurate. It is of importance, therefore, that all of the liquid be retained in the manometer, even when over-ranging occurs.

In the drawing accompanying the present application I have, for purposes of illustration merely, shown one form which my invention may assume.

The figure shows partly in elevation and partly in vertical section, a pot-type of manometer incorporating the principles of my invention. In the manometer shown, a casing 1 encloses a chamber 2 which provides a reservoir for the liquid used in a manometer. The liquid level is shown to normally stay at 3; and a pet cock 4 tapped into the casing 1 approximately at the liquid level 3 permits the zero reading of the manometer to be adjusted and checked.

The low pressure pipe 7 is connected to the chamber 2 by means of a cock 5 tapped into the casing 1 at 6.

In addition to the reservoir for the measuring liquid, the manometer includes a U-tube having one leg terminating in the reservoir and the other leg exposed to the higher of the two pressures. In the embodiment shown, the leg of the U-tube which terminates in the reservoir is constituted by a pipe 8 threaded at 9 into the bottom of the casing 1. At the lower end of the pipe 8 is a T 10; and a pet cock 11 is connected to the downwardly extending branch of the T for the purpose of draining the manometer when it is desired to do this.

The other leg of the U-tube is constituted by a transparent tube 13, such as a glass tube. I have found that when this last tube is of an inner diameter of one-half inch or less, sudden surges will cause bubbles in the liquid. In order not to introduce too large an error in the instrument, the inner diameter of the gauge glass should not exceed one inch. I prefer that the inner diameter be not less than five-eighths of an inch nor more than one inch.

The lower end of the glass 13 enters a gauge cock 14, the connection therewith at 15 being made tight by packed glands. The gauge cock 14 includes a valve having a hand wheel 16 by means of which the discharge of fluid from the gauge cock may be stopped. The gauge cock 14 is connected to the third branch of the T 10.

The upper end of the gauge glass enters an upper gauge cock 18, the connection at 19 being made tight by packed glands. A pet cock 20 is connected to the upper portion of the gauge cock 18, so that the gauge glass may be opened to atmosphere when desired.

A passageway 21 is provided in the casing 1; and this passageway is connected by a pipe 22 to the higher of the two pressures which are to be measured. The gauge cock 18 is threaded at 23 into the casing 1 and communicates with the passageway 21. A valve 24 controlled by a hand wheel 25 permits closing of communication between the passageway 21 and the interior of the gauge cock 18. A plug 26 is provided in the top of the casing 1 through which the measuring liquid may be introduced. Liquid is introduced through the plug 26 into the chamber 2 until the liquid level in the glass tube 13 reaches the zero mark. The liquid level may be checked and adjusted by means of the pet cock 4. By means of the cock 5 and the gauge cock 18, the manometer may be subjected to the two pressures in question. The differential pressure causes the level of the liquid in the glass tube 13 to be lowered, the liquid forced out of the glass tube 13 flowing into the reservoir in the casing 1. Even though a greater differential pressure occurs than that for which the instrument is designed, the only consequence is that all of the liquid is carried over into the casing 1 and pipe 8. The chamber 2 is of sufficient volume to take care of the excess liquid, and since no liquid is lost, the instrument will again accurately measure the pressure differential when conditions return more nearly to normal.

It will be noted that the high pressure gauge connection is made through the casing 1 by means of the gauge cock 18. This promotes the convenience in the use of the manometer and the ease with which repair parts may be obtained. The gauge glass and gauge cocks may be of standard construction which are easily obtained. It should moreover be noted that the apparatus makes it possible to use water as the indicating liquid. This is a distinct advantage, in that water is a standard article which is available everywhere. When oil is employed, it is necessary to replace any loss of liquid by exactly the same oil, since the density of the liquid is a factor in the operation of the instrument. It is apparent, therefore, that my improved construction of manometer, which makes it possible to use water, simplifies the use and operation of the manometer.

Should it be desired to change the gauge glass, the same may be accomplished without loss of liquid by closing the cock 5 and slightly opening plug 26 until the high pressure forces the liquid out of the gauge glass. The cocks 14 and 18 may be closed by turning wheels 16 and 25 which isolates the glass tube 13.

While the connections to the two pressures requires that the zero mark on the gauge be at the top, this does not interfere with the reading of the manometer; and the introduction of the higher pressure into the top of the glass tube overcomes the difficulty with gas bubbles in the column even though water instead of oil is employed as the measuring liquid.

While I have shown one preferred embodiment of my invention, it is to be understood that the invention is not limited to such preferred embodiment, but may be otherwise embodied and constructed within the scope of the appended claims.

I claim:

1. In a manometer for measuring the difference between two pressures, a casing enclosing a reservoir, said casing providing a passage separate from the reservoir, means for introducing the higher of the two pressures into said passageway, means for introducing the lower of the two pressures into the reservoir, a transparent tube having its upper end connected to said passageway, and means providing a conduit connecting the reservoir below the normal liquid level in the same with the lower end of the transparent tube.

2. In a manometer for measuring the difference between two pressures, the combination of a casing enclosing a reservoir, said casing providing a passage separate from the reservoir, means for introducing the higher of the two pressures into said passageway, means for introducing the lower of the two pressures into the reservoir, a transparent tube having its upper end connected to said passageway, means providing a conduit connecting the reservoir below the normal liquid level in the same with the lower end of the transparent tube and means for controlling the liquid level in said tube and reservoir.

3. In a manometer for measuring the difference between two pressures, the combination of a casing enclosing a reservoir, said casing providing a passage separate from the reservoir, means for introducing the higher of the two pressures into said passageway, means for introducing the lower of the two pressures into the reservoir, a transparent tube having an inner diameter in excess of one-half inch and having its upper end connected to said passageway and means providing a conduit connecting the reservoir below the normal liquid level in same with the lower end of the transparent tube.

4. In a manometer for measuring the difference between two pressures, the combination of a casing enclosing a reservoir, said casing providing a passage separate from the reservoir, means for introducing the higher of the two pressures into said passageway, means for introducing the lower of the two pressures into the reservoir, a transparent tube having an inner diameter in excess of five-eighths of an inch and less than one inch and having its upper end connected to said passageway and means providing a conduit connecting the reservoir below the normal liquid level in same with the lower end of the transparent tube.

ROBERT W. CRETNEY.